United States Patent
Jia

(12) 
(10) Patent No.: US 8,705,620 B1
(45) Date of Patent: Apr. 22, 2014

(54) METHOD AND APPARATUS FOR ENCODING ANCHOR FRAME BY ENCODING FEATURES USING LAYERS

(75) Inventor: Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 300 days.

(21) Appl. No.: 13/095,975

(22) Filed: Apr. 28, 2011

(51) Int. Cl.
*H04N 7/12* (2006.01)
*H04N 7/26* (2006.01)

(52) U.S. Cl.
CPC ....... *H04N 7/26297* (2013.01); *H04N 7/26265* (2013.01); *H04N 7/26276* (2013.01)
USPC ....................................................... 375/240.1

(58) Field of Classification Search
CPC ..................................................... H04N 7/50
USPC ............... 375/240.02, 240.18, 240.1, 240.26; 382/164, 173
See application file for complete search history.

(56) References Cited

U.S. PATENT DOCUMENTS

| | | | |
|---|---|---|---|
| 4,924,310 A | | 5/1990 | von Brandt |
| 5,148,269 A | | 9/1992 | de Haan et al. |
| 5,337,086 A | | 8/1994 | Fujinami |
| 5,398,068 A | | 3/1995 | Liu et al. |
| 5,512,952 A | | 4/1996 | Iwamura |
| 5,731,840 A | | 3/1998 | Kikuchi et al. |
| 5,886,742 A | | 3/1999 | Hibi et al. |
| 5,916,449 A | * | 6/1999 | Ellwart et al. .................. 210/745 |
| 5,930,387 A | * | 7/1999 | Chan et al. ..................... 382/166 |
| 5,991,447 A | | 11/1999 | Eifrig et al. |
| 6,005,625 A | * | 12/1999 | Yokoyama ............... 375/240.16 |
| 6,005,980 A | | 12/1999 | Eifrig et al. |
| 6,021,213 A | * | 2/2000 | Helterbrand et al. .......... 382/128 |
| 6,044,166 A | * | 3/2000 | Bassman et al. ............... 382/103 |
| 6,058,211 A | * | 5/2000 | Bormans et al. ............... 382/235 |
| 6,195,391 B1 | | 2/2001 | Hancock et al. |
| 6,272,179 B1 | | 8/2001 | Kadono |
| 6,289,049 B1 | | 9/2001 | Kim et al. |
| 6,359,929 B1 | | 3/2002 | Boon |
| 6,363,119 B1 | | 3/2002 | Oami |
| 6,381,277 B1 | | 4/2002 | Chun et al. |

(Continued)

FOREIGN PATENT DOCUMENTS

EP 0634873 9/1998

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Y Lee
*Assistant Examiner* — Joseph Suh
(74) *Attorney, Agent, or Firm* — Young Basile Hanlon & MacFarlane P.C.

(57) ABSTRACT

A system, method, and apparatus for encoding a frame of video having a plurality of pixels are disclosed. The method includes identifying a plurality of sets of substantially identical adjacent pixels within the frame and determining a number of pixels in each set. The method includes assigning the pixels in each set to one of an enhancement layer or base layer based at least in part on the number of pixels in that set. The method further includes encoding the pixels assigned to the base layer using a first encoding technique and encoding the pixels assigned to the enhancement layer using a second encoding technique.

18 Claims, 8 Drawing Sheets

(56) References Cited

U.S. PATENT DOCUMENTS

| | | | |
|---|---|---|---|
| 6,462,791 B1 | 10/2002 | Zhu | |
| 6,735,249 B1 | 5/2004 | Karczewicz et al. | |
| 7,114,129 B2 | 9/2006 | Awada et al. | |
| 7,197,070 B1 | 3/2007 | Zhang et al. | |
| 7,424,056 B2 | 9/2008 | Lin et al. | |
| 8,111,914 B2 | 2/2012 | Lee et al. | |
| 2002/0017565 A1* | 2/2002 | Ju et al. | 235/454 |
| 2002/0031272 A1 | 3/2002 | Bagni et al. | |
| 2003/0215135 A1* | 11/2003 | Caron et al. | 382/173 |
| 2004/0001634 A1* | 1/2004 | Mehrotra | 382/232 |
| 2004/0017939 A1* | 1/2004 | Mehrotra | 382/173 |
| 2004/0196902 A1 | 10/2004 | Faroudja | |
| 2004/0252886 A1* | 12/2004 | Pan et al. | 382/173 |
| 2005/0185715 A1 | 8/2005 | Karczewicz et al. | |
| 2005/0259729 A1 | 11/2005 | Sun | |
| 2005/0271140 A1 | 12/2005 | Hanamura et al. | |
| 2006/0039470 A1 | 2/2006 | Kim et al. | |
| 2006/0056689 A1* | 3/2006 | Wittebrood et al. | 382/173 |
| 2007/0036354 A1* | 2/2007 | Wee et al. | 380/37 |
| 2007/0065026 A1 | 3/2007 | Lee et al. | |
| 2007/0080971 A1* | 4/2007 | Sung | 345/545 |
| 2007/0121100 A1 | 5/2007 | Divo | |
| 2007/0216777 A1* | 9/2007 | Quan et al. | 348/222.1 |
| 2007/0217701 A1* | 9/2007 | Liu et al. | 382/234 |
| 2008/0069440 A1* | 3/2008 | Forutanpour | 382/163 |
| 2008/0239354 A1* | 10/2008 | Usui | 358/1.9 |
| 2008/0260042 A1 | 10/2008 | Shah et al. | |
| 2009/0122867 A1 | 5/2009 | Mauchly et al. | |
| 2009/0161763 A1 | 6/2009 | Rossignol et al. | |
| 2009/0232401 A1* | 9/2009 | Yamashita et al. | 382/199 |
| 2009/0237728 A1 | 9/2009 | Yamamoto | |
| 2009/0307428 A1 | 12/2009 | Schmieder et al. | |
| 2010/0021009 A1* | 1/2010 | Yao | 382/103 |
| 2010/0026608 A1 | 2/2010 | Adams et al. | |
| 2010/0034268 A1 | 2/2010 | Kusakabe et al. | |
| 2010/0104021 A1 | 4/2010 | Schmit | |
| 2010/0235583 A1 | 9/2010 | Gokaraju et al. | |
| 2011/0002541 A1* | 1/2011 | Varekamp | 382/173 |
| 2011/0010629 A1 | 1/2011 | Castro et al. | |
| 2011/0026591 A1 | 2/2011 | Bauza et al. | |
| 2011/0033125 A1* | 2/2011 | Shiraishi | 382/238 |
| 2011/0069890 A1* | 3/2011 | Besley | 382/199 |
| 2011/0158529 A1* | 6/2011 | Malik | 382/173 |
| 2011/0219331 A1 | 9/2011 | DeLuca et al. | |
| 2011/0255592 A1* | 10/2011 | Sung et al. | 375/240.02 |
| 2011/0268359 A1* | 11/2011 | Steinberg et al. | 382/173 |
| 2012/0020408 A1* | 1/2012 | Chen et al. | 375/240.03 |
| 2012/0278433 A1* | 11/2012 | Liu et al. | 709/217 |
| 2012/0314942 A1* | 12/2012 | Williams et al. | 382/164 |

OTHER PUBLICATIONS

"Series H: Audiovisual and Multimedia Systems; Infrastructure of audiovisual services—Coding of moving video; Advances Video coding generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure fo audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitsream & Decoder Specification". Version 1.02 On2 Technologies, Inc. Dated Aug. 17, 2006.

"Series H: Audiovisual and Multimedia Systems; Infrastructure of audiovisual servies—Coding of moving video". H.264. Amendment 2: New profiles for professional applications. International Telecommunicaiton Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infractructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Nokia, Inc., Nokia Research Center, "MVC Decoder Description", Telecommunication Standardization Sector, Study Period 1997-2000, Geneva, Feb. 7, 2000, 99 pp.

Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.

Wright, R. Glenn, et al.; "Multimedia—Electronic Technical Manual for ATE", IEEE 1996, 3 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Strobach, Peter; "Tree-Structured Scene Adaptive Coder", IEEE Transactions on Communications, vol. 38, No. 4, Apr. 1990, 10 pp.

Steliaros, Michael K., et al.; "Locally-accurate motion estimation for object-based video coding", SPIE vol. 3309, 1997, 11 pp.

Martin, Graham R., et al.; "Reduced Entropy Motion Compensation Using Variable Sized Blocks", SPIE vol. 3024, 1997, 10 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Guillotel, Philippe, et al.; "Comparison of motion vector coding techniques", SPIE vol. 2308, 1994, 11 pp.

Orchard, Michael T.; "Exploiting Scene Structure in Video Coding", IEEE 1991, 5 pp.

Liu, Bede, et al.; "A simple method to segment motion field for video coding", SPIE vol. 1818, Visual Communications and Image Processing 1992, 10 pp.

Ebrahimi, Touradj, et al.; "Joint motion estimation and segmentation for very low bitrate video coding", SPIE vol. 2501, 1995, 12 pp.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp.

Zhang, Kui, et al.; "Variable Block Size Video Coding With Motion Prediction and Motion Segmentation", SPIE vol. 2419, 1995, 9 pp.

(56) References Cited

OTHER PUBLICATIONS

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Nicolas, H., et al.; "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web". Dated Jul. 11, 2011.

Office Action Mailed Jun. 5, 2013 in co-pending U.S. Appl. No. 13/095,971, filed Apr. 28, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Office Action mailed May 30, 2013 in co-pending U.S. Appl. No. 13/089,383, filed Apr. 19, 2011.

Jun-Ren Ding et al.; "Two-Layer and adaptive entropy coding algorithms for H. 264-based lossless image coding", Acoustics, Speech and Signal Processing, 2008. ICASSP 2008. IEE International conference on IEEE, Piscatawa, NJ, USA Mar. 31, 2008.

Patent Cooperation Treaty Invitation to Pay Fees in related matter, International Searching Authority International Application No. PCT/US2013/063722 mailed on Dec. 9, 2013.

Schwarz H. et al.: "SNR-scalable extension of H.264/AVC", Image Processing, 2004. ICIP 2004 International Conference on Singapore Oct. 24-27, 2004.

\* cited by examiner

METHOD AND APPARATUS FOR ENCODING ANCHOR FRAME BY ENCODING FEATURES USING LAYERS

TECHNICAL FIELD

The present invention relates in general to video encoding and decoding.

BACKGROUND

Digital video streams typically represent video using a sequence of frames (i.e. still images). An increasing number of applications today make use of digital video stream encoding for purposes other than traditional moving pictures (such as movies and video clips). For example, screen capture and screen casting applications generally represent the output of a computer monitor over time as a digital video stream, irrespective of the specialized nature of the content of the monitor. Typically, screen capture and screen casting digital video streams are encoded using video encoding techniques like those used for traditional moving pictures.

To permit transmission of digital video streams while limiting bandwidth consumption, a number of video compression schemes have been devised, including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use quantization and transform techniques on the frames of a digital video stream to reduce the bitrate (i.e. encoded data size) of the encoded digital video stream. Such techniques are lossy in nature—meaning that part of the original digital video stream is lost during encoding. Quantization techniques are used to discard part of a frame's data based on standard computations, thereby reducing the frame's bitrate. Quantization is a low-pass technique, which can cause blurring or other effects on a frame. These effects result in video artifacts around the edges in the frame's contents, such as ring artifacts. These artifacts are especially noticeable in digital video streams containing numerous edges, such as in screen capture and screen casting applications.

SUMMARY

In accordance with one aspect of the disclosed embodiments, a method is provided for encoding a video frame having a plurality of pixels. The method includes identifying a plurality of sets of substantially identical adjacent pixels within the frame and determining a number of pixels in each set. The method includes assigning the pixels in each set to one of an enhancement layer or base layer based at least in part on the number of pixels in that set. The method further includes encoding the pixels assigned to the base layer using a first encoding technique and encoding the pixels assigned to the enhancement layer using a second encoding technique.

In accordance with another aspect of the disclosed embodiments, an apparatus is provided to encode a video signal. The apparatus includes a memory and a processor to encode a video signal. The processor is configured to execute instructions stored in the memory to (1) identify a plurality of sets of adjacent pixels within the frame, wherein each set includes pixels that are substantially identical, (2) determine a number of pixels in each set, (3) assign the pixels in each set to one of an enhancement layer or base layer based at least in part on the number of pixels in that set, (4) encode the pixels assigned to the base layer using a first encoding technique, and (5) encode the pixels assigned to the enhancement layer using a second encoding technique.

A second embodiment of the apparatus aspect is for encoding a frame of video having a plurality of pixels. The apparatus includes means for identifying a plurality of sets of substantially identical adjacent pixels within the frame and means for determining a number of pixels in each set. The method includes means for assigning the pixels in each set to one of an enhancement layer or base layer based at least in part on the number of pixels in that set. The method further includes means for encoding the pixels assigned to the base layer using a first encoding technique and means for encoding the pixels assigned to the enhancement layer using a second encoding technique.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

This Application hereby incorporates by reference in the entirety the following: co-pending U.S. patent application Ser. No. 13/089,383 filed on Apr. 19, 2011 and entitled "METHOD AND APPARATUS FOR ENCODING VIDEO USING DATA FREQUENCY", co-pending U.S. patent application Ser. No. 13/095,974 filed on Apr. 28, 2011 and entitled "METHOD AND APPARATUS FOR ENCODING VIDEO USING MATCHING REGIONS", co-pending U.S. patent application Ser. No. 13/095,971 filed on Apr. 28, 2011 and entitled "METHOD AND APPARATUS FOR ENCODING VIDEO WITH DYNAMIC QUALITY IMPROVEMENT".

Figure 1:
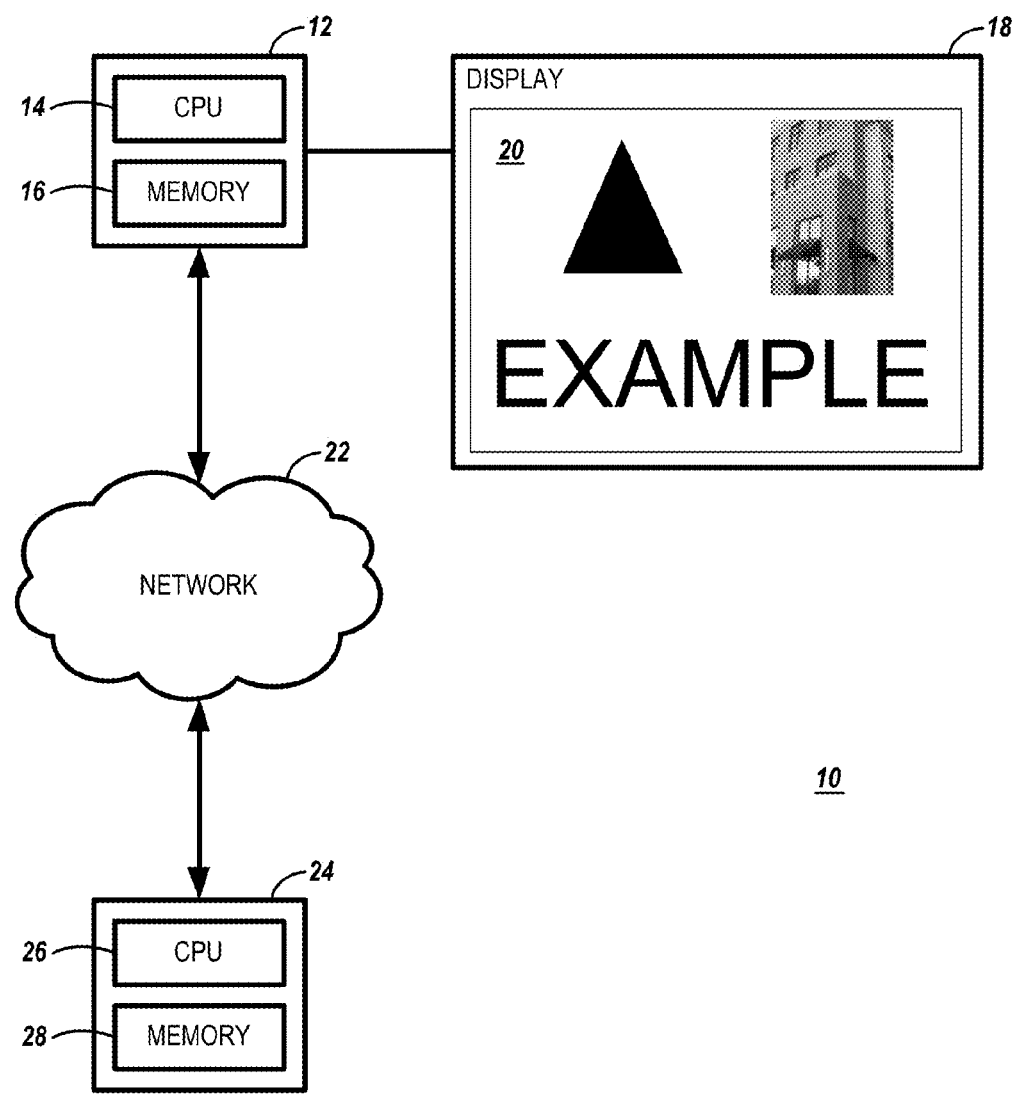
FIG. 1 is a diagram of an encoder and decoder system in accordance with one embodiment.

FIG. 1 is a diagram of an encoder and decoder system 10 for digital video streams. An exemplary transmitting station 12 may be, for example, a computer having an internal configuration of hardware including a central processing unit (CPU) 14 and memory 16. The CPU 14 is a controller for controlling the operations of transmitting station 12. The CPU 14 is connected to memory 16 by, for example, a memory bus. The memory 16 may be random access memory (RAM). The memory 16 stores data and program instructions which are used by the CPU 14. Other suitable implementations of transmitting station 12 are possible such as those explained later.

A display 18 configured to display video output can be connected to transmitting station 12. The display 18 can be implemented in various ways, including by a liquid crystal display (LCD) or a cathode-ray tube (CRT). The display 18 can also be configured for other uses, such as screen casting or screen capture. The display 18 can display, for example, a frame 20 of a digital video stream.

The frame 20 may include output from the graphical user interface (GUI) of the transmitting station 12. It may include, for example, visual elements such as a taskbar, one or more application windows, and a desktop background. The application windows, for example, may include text, images, or other graphics that may be scrolled within the application windows. However, the frame 20 may include any sequence of video frames containing any type of image, including movies, video clips, or still images.

A network 22 connects the transmitting station 12 and a receiving station 24. The network 22 may, for example, be what is commonly known as the Internet. The network 22 may also be a local area network (LAN), wide area network (WAN), virtual private network (VPN), or any other means of transferring data between transmitting station 12 and receiving station 24.

The exemplary receiving station 24 may be a computer having an internal configuration of hardware include a central processing unit (CPU) 26 and a memory 28. The CPU 26 is a controller for controlling the operations of transmitting station 12. The CPU 26 is connected to memory 28 by, for example, a memory bus. The memory 28 may be random access memory (RAM). The memory 28 stores data and program instructions which are used by the CPU 26. Other suitable implementations of receiving station 24 are possible such as those explained later.

Figure 2:
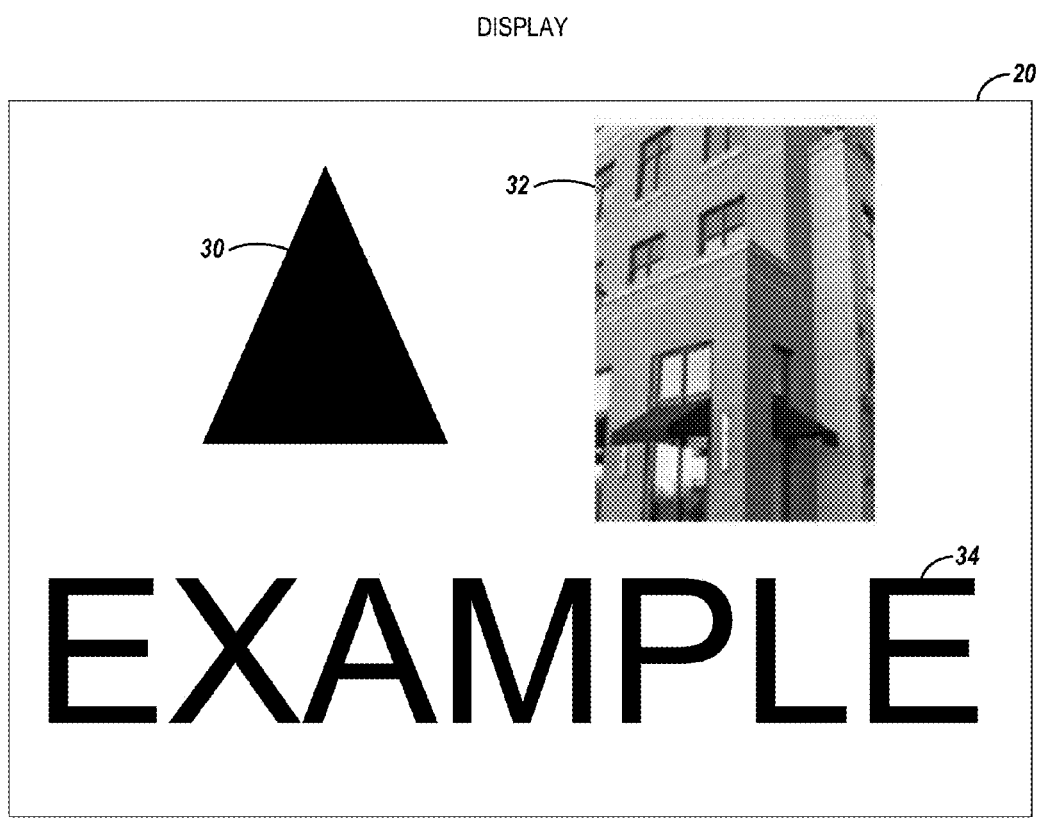
FIG. 2 is an exemplary frame of a digital video stream in the system of FIG. 1.

FIG. 2 is an exemplary frame 20 of the digital video stream as shown in FIG. 1. In the example shown, the frame 20 has geometrical 30, image 32, and text 34 components. Each component has specific characteristics. For example, the geometrical component 30 has pixels that are the same color. Each line of pixels that includes a part of the geometrical component 30 may contain a different number of pixels of the geometrical component 30. For example, the top of geometrical component 30 may only have one pixel in a line of pixels, whereas the bottom of geometrical component 30 may have hundreds of pixels in a line of pixels.

With respect to the image 32, it contains varying colors that together depict a building. With respect to the text 34, the majority of the pixels in each letter of text 34 has the same exact color (black). However, for example, text 34 may be anti-aliased. In such a case, the edges of text 34 will be blurred and the pixels at the edges of text 34 will be various shades of color between the text (black) and the background (white).

The frame 20 and its contents have been chosen purely for explanatory purposes. Practical applications of the methods herein are applicable to digital video streams that may be much more complex than frame 20, and may contain frames that have aspects similar to or different than one or more of the aspects of the frame 20. For example, a frame could include a taskbar and application window(s) that are represented using geometrical shapes, images, text, and combinations or variations thereof.

Figure 3:
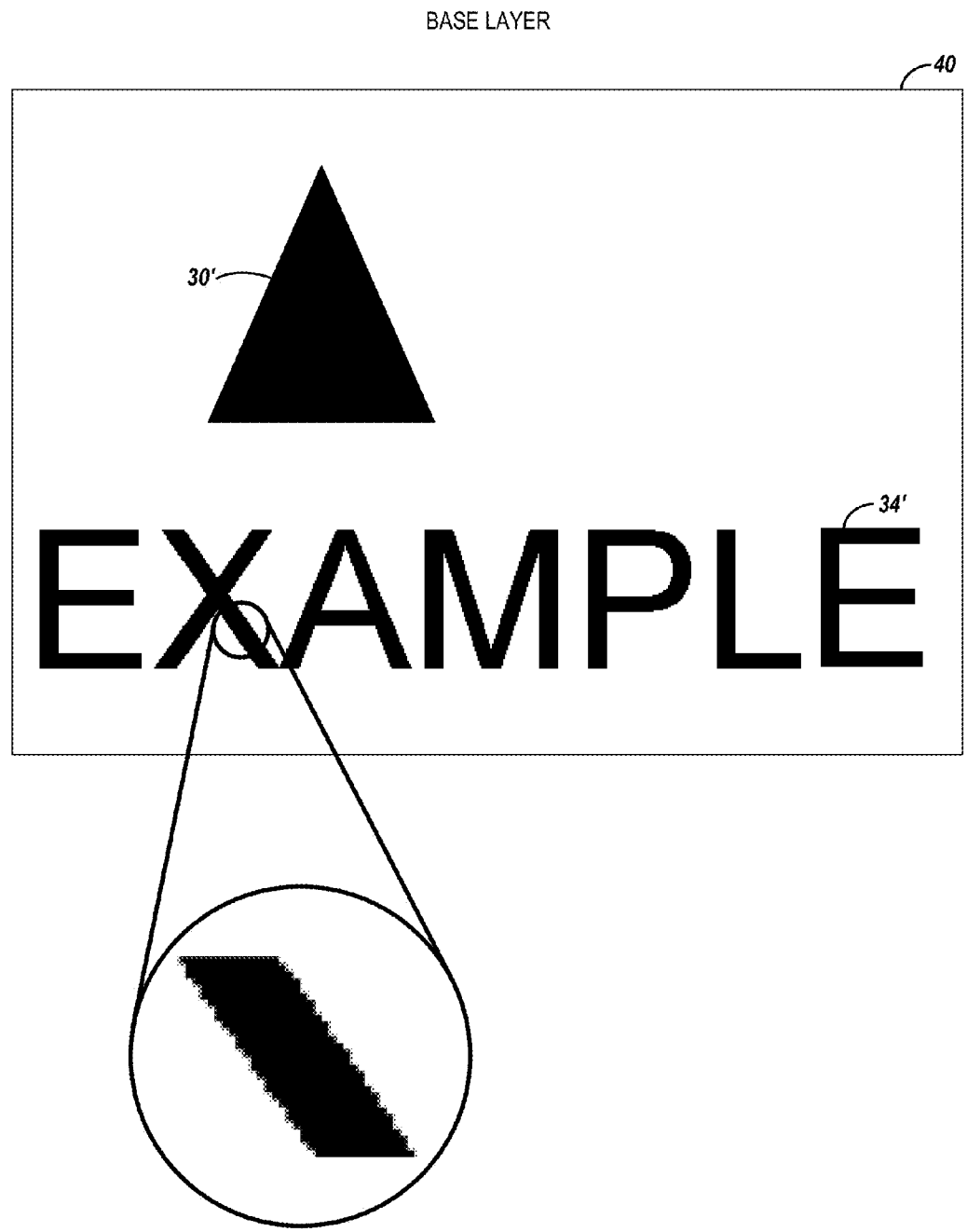
FIG. 3 is the base layer portion of the frame of FIG. 2.
Figure 4:
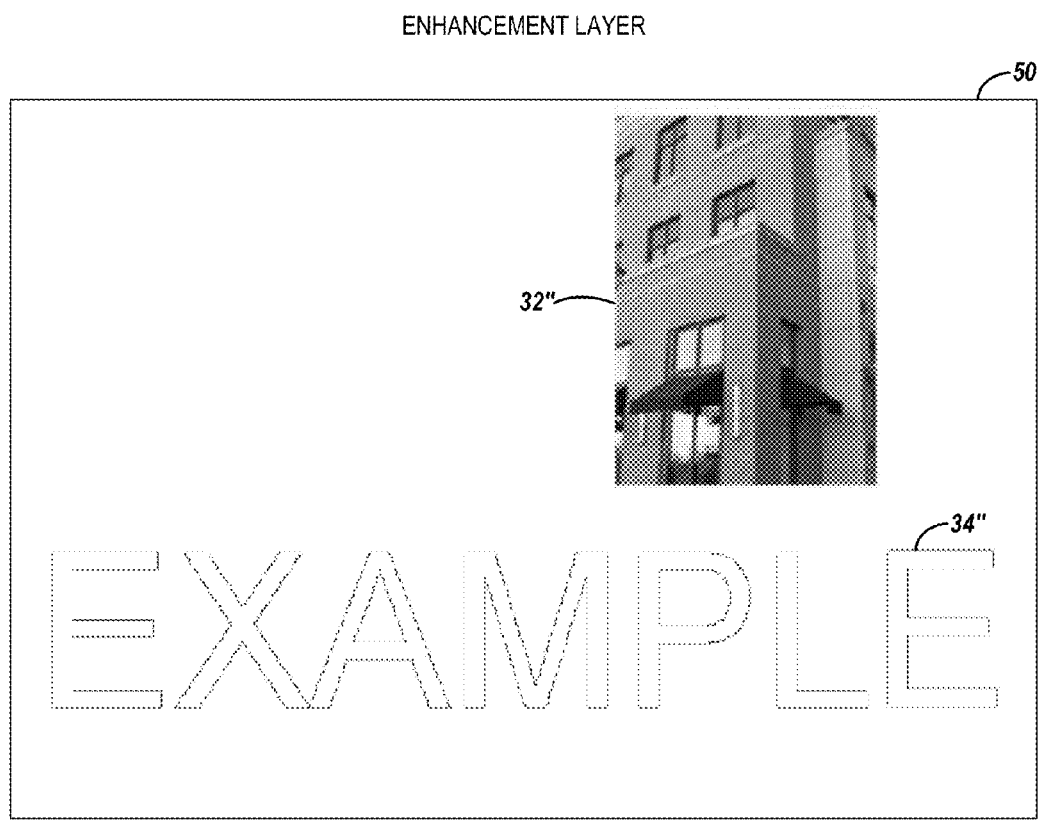
FIG. 4 is the enhancement layer portion of the frame of FIG. 2.

FIG. 3 is the base layer portion 40 of the exemplary frame 20 of FIG. 2 and FIG. 4 is the enhancement layer portion 50 of the exemplary frame 20 of FIG. 2. With respect to both figures, the exemplary frame 20 can be divided into a base layer portion 40 and an enhancement layer portion 50. The layers distinguish between high-frequency and low-frequency portions of the frame. The base layer portion is primarily composed of low frequency data, whereas the enhancement layer portion is primarily composed of high frequency data. In this context, frequency refers to the rate of change of the value of pixels in the frame. For example, with respect to the base layer portion 40, the geometrical component 30', non anti-aliased text 34' and white background could be considered as low frequency portions. Both have a very low rate of change in pixel values and each have substantially identical pixel values.

The determination of whether a pixel is substantially identical can vary from implementation to implementation. The basic determination is whether or not the color value of spatially correspondent pixels in the reference frame and the non-anchor frame are exactly the same. In other words, the pixels are collocated between two blocks or two frames. However, in some instances, it may be preferable to include pixels in the static content area with substantially similar color value(s), for example, within a threshold. In this instance, the decoded version of the non-anchor frame would reference the color value of the pixel from the reference frame, even though it may be different than the color value of the pixel actually in the non-anchor frame.

In one example, a difference between color value A and color value B represented using RGB values could be calculated as $(R_A-R_B)+(G_A-G_B)+(B_A-B_B)$. If the calculated difference is less than the threshold, then the two color values would be considered substantially identical. However, other schemes and methods of determining whether pixels are substantially identical may be used as well.

In addition, a pixel may be substantially identical even if it is not very similar. An implementation may include a process for despeckling the static content area. For example, the process may determine that a pixel in the non-anchor frame is an error or an aberration in the non-anchor frame and may include that pixel in the static content area even though it is not similar to the spatially correspondent pixel in the reference frame. Also, a portion of pixels in a frame may be substantially identical to another portion if a majority of pixels in the portions are substantially identical.

To contrast, with respect to enhancement layer portion 50, image 32' is an example of a high frequency portion, with variations in pixel values over small areas of the frame. Also, anti-aliased text 34'' could be included in the enhancement layer portion 50 because of the variation in pixel values from black to white over a very small area.

Dividing the frame into enhancement and base layers allow for application of encoding schemes that are situated for the characteristics of each layer. The base layer will typically include background areas and edges within a frame. Typically, the base layer would encompass GUI elements on a computer screen, such as the taskbar, application windows, or a constant color background. However, other types of video data can be included in the base layer, such as is found in presentation slideshows and line drawings or animated versions thereof.

The base layer can be encoded using a high-quality encoding scheme, which can be, for example, a lossless encoding scheme. Alternatively, the high-quality encoding scheme can be a lossy encoding scheme that does not result in a significant visual loss. The high-quality encoding scheme can provide a better decoded digital video signal for the base layer by eliminating or greatly reducing the encoding artifacts that can be introduced using other techniques. The high quality encoding scheme can be implemented with high levels of compression with zero or little loss because the base layer is more repetitive in nature.

The enhancement layer can be encoded using standard video or image encoding techniques, including los sy encoding schemes. Such techniques can include a high-quality encoding scheme or a low-quality encoding scheme (i.e. having a greater degree of loss than the high-quality encoding scheme). The low-quality encoding scheme, while resulting in greater data loss, can be less noticeable to the end user when applied to the enhancement layer only, as opposed to being applied to the entire frame (including the base layer). This is because the data in the enhancement layer, being of primarily high frequency data, is more susceptible to standard encoding techniques at higher quantization levels than the data in the base layer. Encoding techniques that can be used include MJPEG, H.264, and VP8 encoding standards although any still or video image encoding technique may be used.

An anchor frame is a frame that is encoded with reference to no other frames. A non-anchor frame is a frame that is encoded with reference to a previously encoded frame. In one implementation, the non-anchor frame refers to the frame immediately preceding the current frame. The encoder can determine that the current frame is an anchor frame using a number of different methodologies. For example, the current frame can be an anchor frame based upon the position of the current frame in the video data stream. If, for example, the current frame is the first frame in the video data stream, the current frame will be an anchor frame.

The current frame can also become an anchor frame if it is requested by the receiving station 24. For example, the receiving station 24 might detect an error in a sequence of encoded non-anchor frames. In order to recover from the error, the receiving station 24 can request that the next frame be an anchor frame. More sophisticated methods of determining whether to use the current frame as an anchor frame can also be used. For example, the current frame may be deemed an anchor frame if the difference between the current frame and the immediately preceding frame is large. Or the encoder can strategically determine points in time to insert an anchor frame to prevent error propagation.

The system of encoding and decoding using base and enhancement layers is further described in a contemporaneously filed US Patent Application entitled "System and Method for Encoding Video Using Frequency-Based Layers," assigned to Google, Inc. and incorporated herein by reference.

Figure 5:
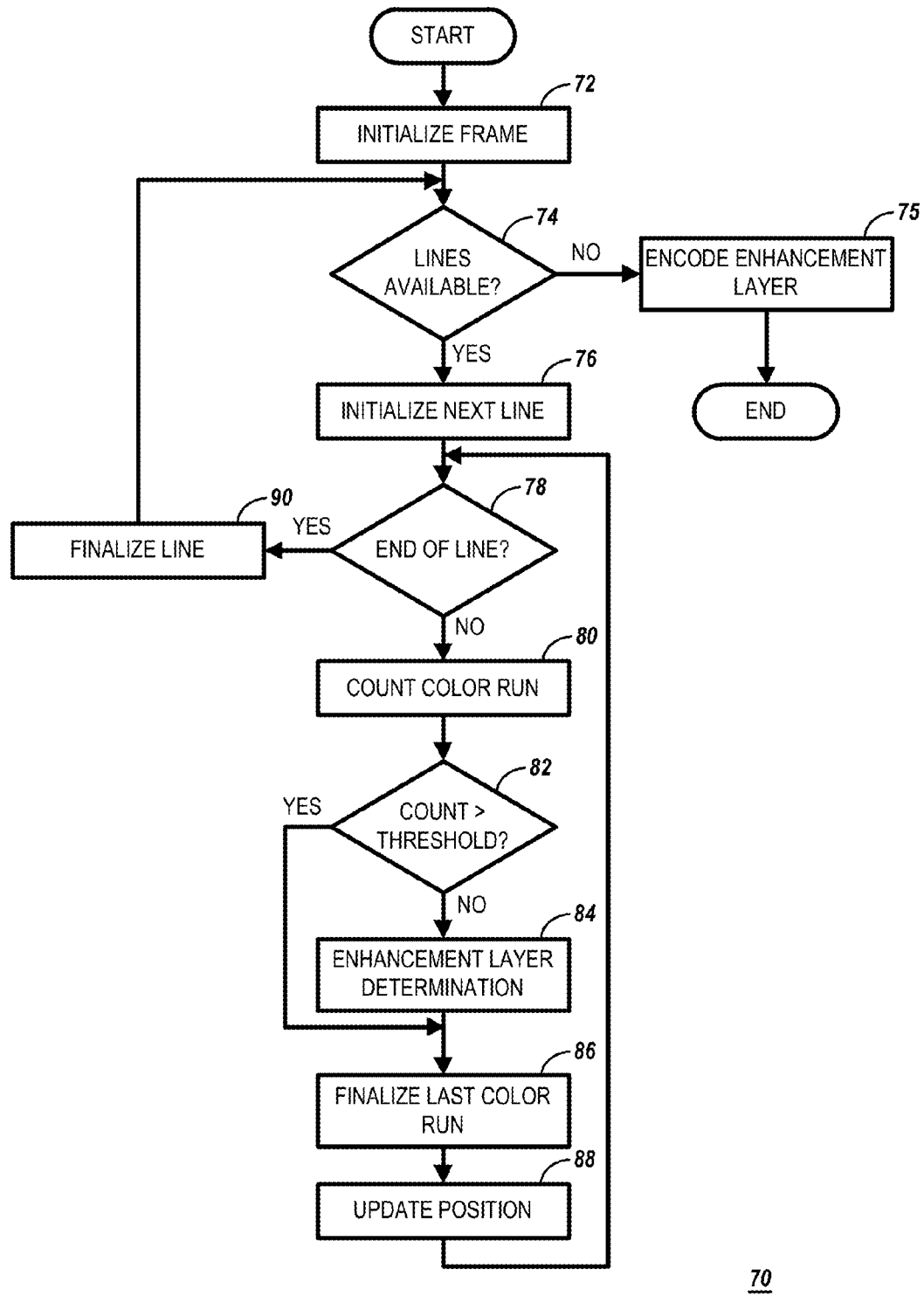
FIG. 5 is a flowchart of a method of encoding an anchor frame by the encoder of FIG. 1.

FIG. 5 is a flowchart of a method 70 of encoding an anchor frame by the encoder of FIG. 1. The anchor frame is first initialized (72). Initialization can include setting up initial values for variables needed during the encoding process. For example, a bitmask can be set up that can later be used to identify whether pixels are in the base layer or enhancement layer. Other counters and pointers can be initialized, including the current line of pixels being encoded, the number of lines available to be encoded, and the position and length of the current and last color runs that have been identified.

Once variables have been initialized, the encoder determines whether any lines of pixels are available to be encoded (74). If not, all base layer pixels in the frame have been encoded, and the encoder will then encode the enhancement layer (75). The enhancement layer can be encoded using encoding techniques that are described above and in the referenced co-pending application.

If a line is available, the next line is selected and initialized (76). During initialization the starting pixel of the current color run is set as the first pixel in the line and the last color run can be set to NULL. The current color run will then be counted, starting from the starting pixel (80). The counting of the color run will include all substantially identical pixels that are consecutively adjacent to the starting pixel. Once counted, the color run will have a pixel count equal to the number of pixels in the color run. Color runs can also be referred to as a run, a run of pixels, or as a set of adjacent pixels.

The number of pixels is compared to a threshold (82). If the number of pixels is greater than the threshold, the color run is in the base layer. However, if the number of pixels is less than the threshold, an enhancement layer determination method will be performed (84). The enhancement layer determination method will determine whether the color run is in the base or enhancement layer. The enhancement layer determination method is described later with respect to FIG. 6.

Once the layer of the color run is determined, the last color run is finalized with respect to the current run (86). The finalization process is described in more detail with respect to FIG. 7. At this point, the current color run is finished being processed, and the starting pixel is set to the pixel immediately after the current color run (88).

At this point, the encoder determines whether the last color run went to the end of the current line of pixels (78). In other words, the encoder determines if the next starting pixel is past the end of the line of pixels. If not, control returns to stage 80 where the next color run will be counted. However, if the last color run went to the end of the current line of pixels, the line will be finalized (90). Finalization of the line includes encoding the last color run in the line, which at this point would not have yet been encoded. Encoding a color run is described in more detail later with respect to FIG. 8. Once the line is finalized, control returns to stage 74, where the encoder will determine whether any additional lines of pixels are available for encoding.

Figure 6:
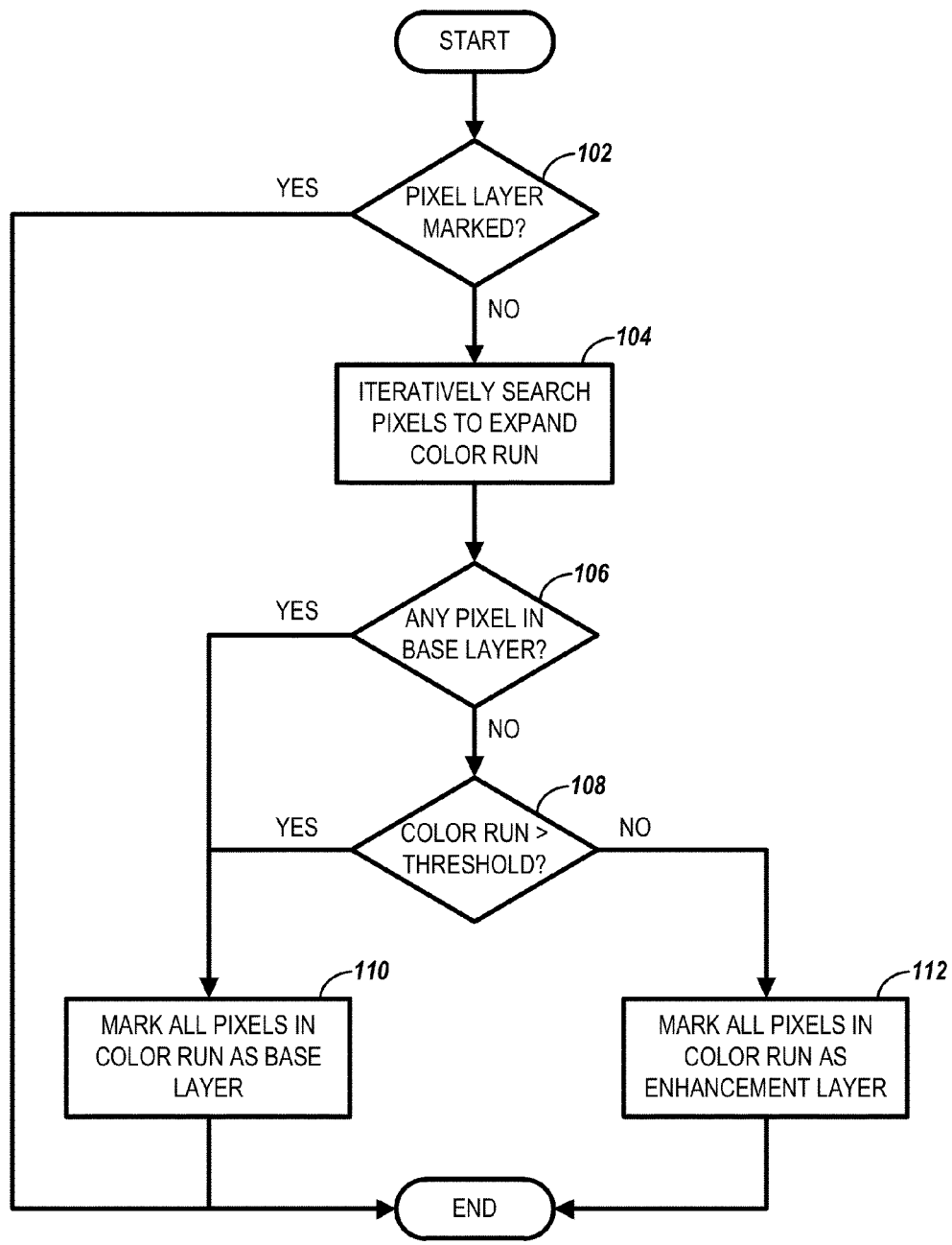
FIG. 6 is a flowchart of an enhancement layer determination method of assigning pixels of the frame as being either in the base layer or the enhancement layer.

FIG. 6 is a flowchart of an enhancement layer determination method 100 of assigning pixels of the frame as being either in the base layer or the enhancement layer. This method is utilized if a color run in a line of pixels is smaller than the threshold. First, if any of the pixels in the color run were previously marked as being in the base or enhancement layer using this method, all pixels in that color run will be marked as being in that layer and the method will end (102).

Otherwise, an iterative search of pixels in adjacent lines of pixels below the color run will be performed (104). The iterative search locates any consecutively adjacent substantially identical pixels that the color run can be expanded to encompass. However, the iterative search can be halted once the number of pixels in the color run exceeds the threshold to improve encoding efficiency. The search can be performed using a four-neighbor or eight-neighbor search method, but other search methods could also alternatively be used.

Once the color run is expanded, it is checked to see if any pixel in the expanded color run is already marked as being in the base layer (106). And the number of pixels in the color run will be compared to the threshold (108). If either there was a pre-existing base layer pixel or if the number of pixels exceeds the threshold, the pixels in the expanded color run will be marked as being in the base layer (110). Otherwise, the pixels in the expanded color run will be marked as being in the enhancement layer (112).

Figure 7:
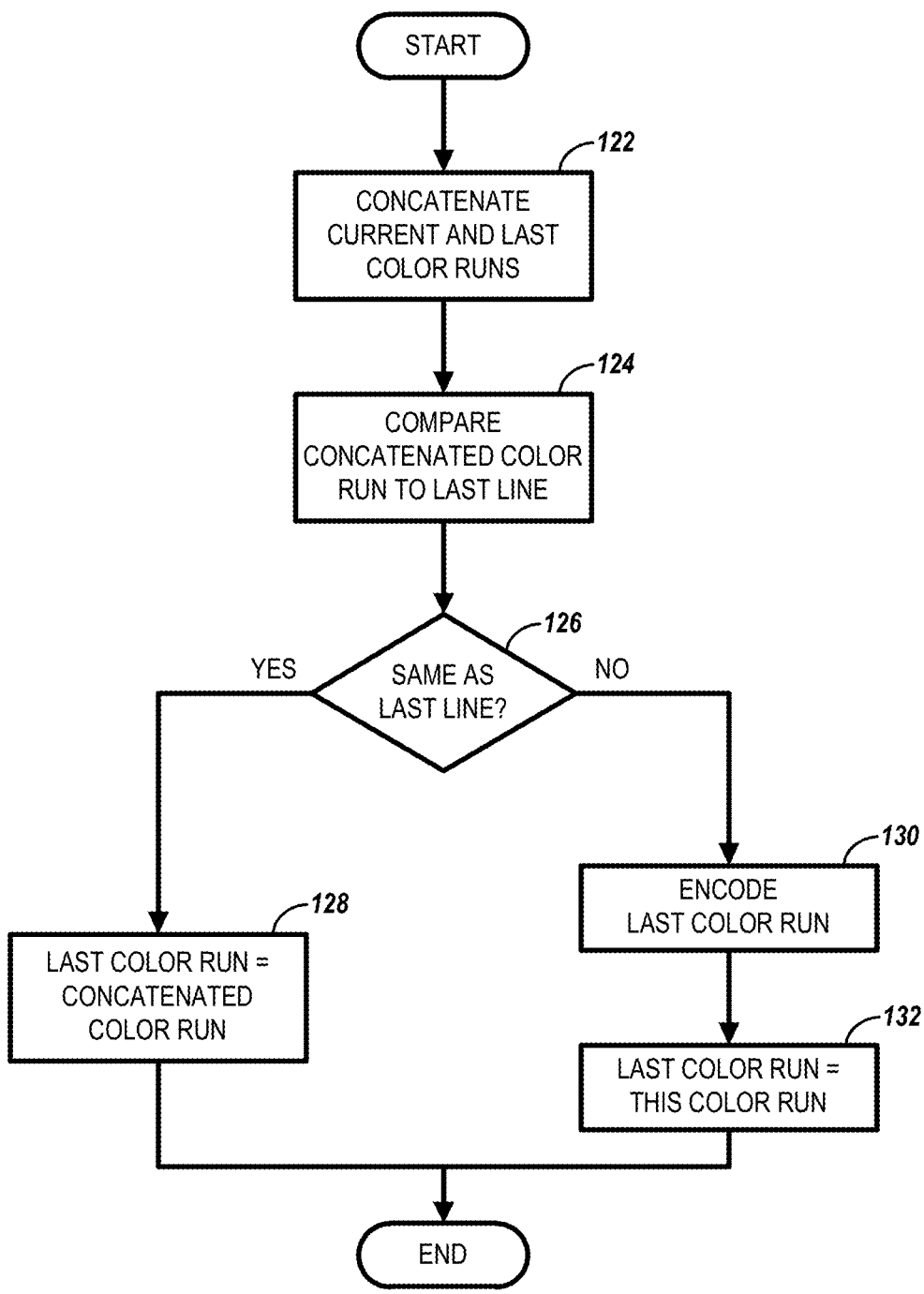
FIG. 7 is a flowchart of a method of optimizing the encoding of consecutive runs of pixels having matching runs of pixels in previous lines of pixels in the frame.

FIG. 7 is a flowchart of a method 120 of finalizing a last color run with optimization. The method 120 compares concatenated runs in the current line of pixels to the previous line of pixels to optimize encoding of lines of pixels that are repetitive in nature. The method 120 is performed after a current color run is identified and when there is a last run (i.e. the current color run is not the first color run in the line of pixels).

First, the encoder concatenates the current and last runs into a concatenated run (122). The concatenated run is compared to pixels from the previous line of pixels starting with the same starting pixel location as the concatenated run (124). The encoder determines if the concatenated run and the pixels from the previous line of pixels are substantially identical (126). If so, the last color run is set to be the concatenated run (128).

Otherwise, the last run is encoded (130). The encoding of color runs is described in more detail with respect to FIG. 8. Once the last run is encoded, the current color run is set as the last run (132).

Figure 8:
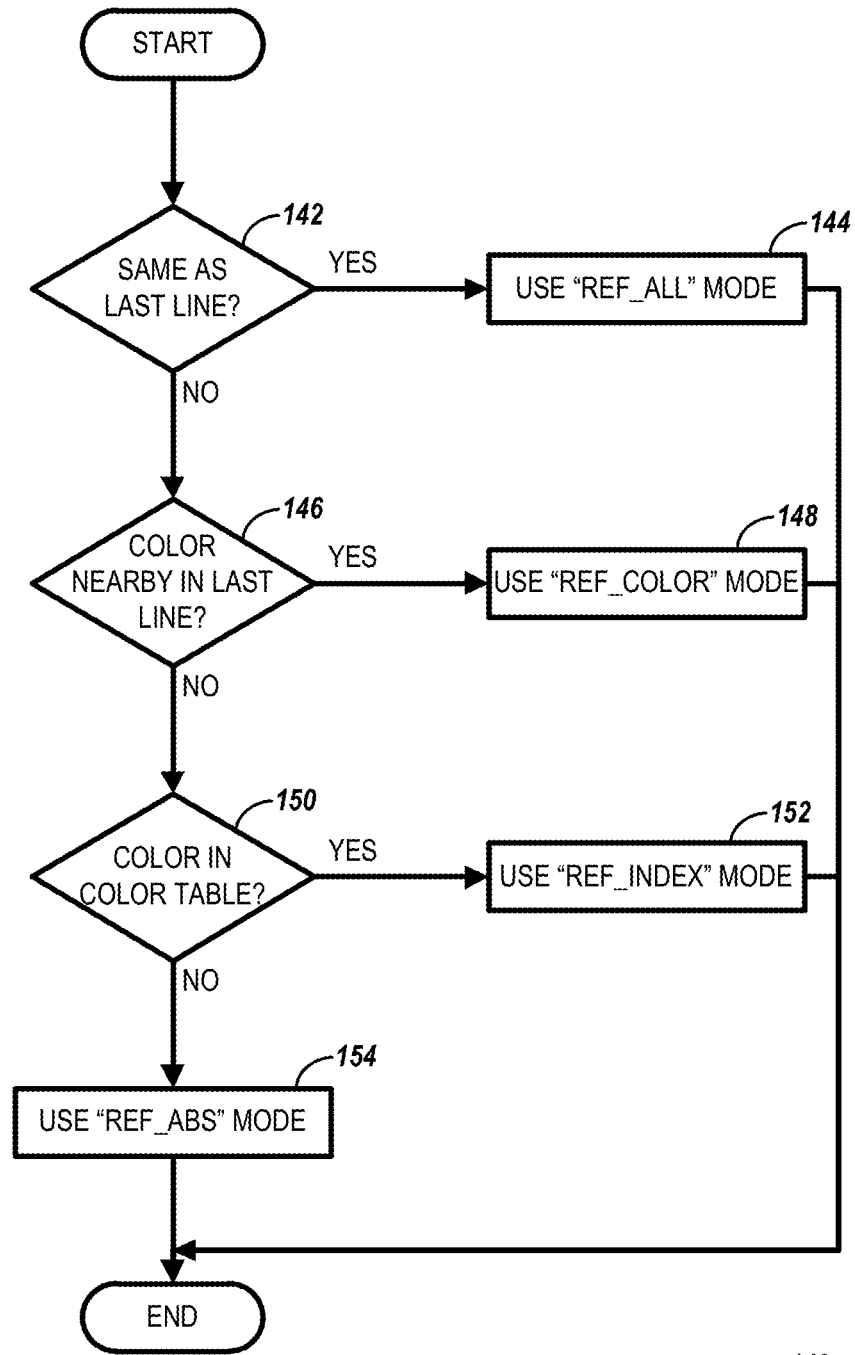
FIG. 8 is a flowchart of a method of encoding a run of pixels.

FIG. 8 is a flowchart of a method 140 of encoding a color run. First, the encoder determines whether the color run is the same as the last line (142). The encoder makes the determination by comparing the pixels in the previous line starting with the starting pixel location (i.e. same column) of the color run to be encoded with the color run to be encoded. If the color run to be encoded is a concatenated run, then it will match the previous line because a prerequisite to concatenation is that the concatenated run be substantially identical to the previous line of pixels. If there is a match, the color run is encoded using the "REF_ALL" mode (144). This mode encodes the color run using the starting pixel of the color run and the length of the color run. This encoding mode implicitly references to a run of pixels having the same starting pixel location and run length in the previous line of pixels for the color value(s) of the color run.

If there is not a match, the encoder next determines if the color run's color value is found nearby (146). For this determination, the encoder examines color runs in the previous line of pixels above the color run to be encoded. If a substantially identical color value is found, then the color run is encoded using the "REF_COLOR" mode (148). This mode encodes the color run also by using the starting pixel of the color run and the length of the color run. In contrast to the previous mode, the color value of the color run is identified by an index of the matching color run in the previous line.

If there is not a match nearby, the encoder next determines if the color run's color value has been used previously during the encoding of the frame (150). For this determination, the encoder keeps a color table of color values for each color value encountered while encoding the frame. The color table is constructed sequentially so that a decoder can reconstruct the color table simply by decoding the encoded color runs. By this method, each color value need only be encoded using its absolute value once per frame.

If the color run's color value is found in the color table, the color run is encoded using the "REF_INDEX" mode (152). This mode also encodes the color run using the starting pixel of the color run and the length of the color run. In contrast to the previous modes, the color value of the color run is identified by an index of the color table that is constructed by the encoder. Otherwise, if the color run's color value is not found in the color table, the color run is encoded using the "REF_ABS" mode (154). This mode encodes an absolute representation of the color value at the full color depth used by the frame (i.e. 16, 24, or 32 bit RGB encoding). Alternately, other color representation schemes can be used, such as YUV encoding.

Transmitting station 12 and receiving station 24 can be implemented in whole or in part by one or more computers, servers, processors or any other suitable computing device or system that can carry out any of the embodiments described herein. In one embodiment, for example, transmitting station 12 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 24 can, for example, be implemented on computers in a screen casting system. Alternatively, transmitting station 12 can be implemented on a server and receiving station 24 can be implemented on a device separate from the server, such as a handheld communications device (i.e. a cell phone). In this instance, transmitting station 12 can encode content and transmit an encoded video signal to the communications device. In turn, the communications device can then decode an encoded video signal. Alternatively, the communications device can decode content stored locally on the communications device (i.e. no transmission is necessary). Other suitable transmitting station 12 and receiving station 24 implementation schemes are available. For example, receiving station 24 can be a personal computer rather than a portable communications device.

The operation of encoding and decoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of transmitting station 12 and/or receiving station 24 (and the algorithms, methods, instructions etc. stored thereon and/or executed thereby) can be realized in hardware, software, or any combination thereof including, for example, IP cores, ASICS, programmable logic arrays, quantum or molecular processors, optical processors, programmable logic controllers, microcode, firmware, microcontrollers, servers, microprocessors, digital signal processors or any other suitable circuit. In the claims, the term "processor" should be understood as encompassing any the foregoing devices, either singly or in combination. The terms "signal" and "data" are used interchangeably. Further, portions of transmitting station 12 and receiving station 24 do not necessarily have to be implemented in the same manner. Thus, for example, some portions can be implemented in software and others in hardware. In one embodiment, for example, transmitting station 12 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, contain, store, communicate, or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video frame having a plurality of pixels, the method comprising:
   identifying a plurality of sets of adjacent pixels within the frame, wherein each set includes substantially identical pixels identified by combining color values of adjacent pixels arithmetically and applying a color value threshold to a result of the combining;
   determining a number of pixels in each set using a processor;
   assigning the pixels in each set to one of an enhancement layer or base layer based at least in part on the number of pixels in that set, including:
      assigning each pixel in a set of adjacent pixels to the base layer if the number of pixels in the set exceeds a pixel count threshold or any pixel in the set of adjacent pixels was previously assigned to the base layer regardless of the pixel count; and
      assigning each pixel in the set of adjacent pixels to the enhancement layer if the number of pixels in the set does not exceed the pixel count threshold and no pixel in the set of adjacent pixels was previously assigned to the base layer;
   encoding the pixels assigned to the base layer using a first encoding technique; and
   encoding the pixels assigned to the enhancement layer using a second encoding technique; wherein
   substantially identical pixels have a same color value or a similar color value.

2. The method of claim 1, wherein at least one set of the plurality of sets of adjacent pixels includes overlapping sets.

3. The method of claim 1, wherein identifying a set of adjacent pixels comprises:
   identifying a starting pixel from a line of pixels in the frame; and
   identifying a run of pixels in the line of pixels starting from the starting pixel and including consecutively adjacent substantially identical pixels; and
   identifying the set of adjacent pixels as the run of pixels.

4. The method of claim 3, wherein identifying a set of adjacent pixels further comprises:
   if a pixel count of the set of adjacent pixels is less than a threshold:
      expanding the set of adjacent pixels into one or more adjacent lines of pixels.

5. The method of claim 4, wherein expanding the set of adjacent pixels into the one or more adjacent lines of pixels comprises:
   identifying one or more consecutively adjacent substantially identical pixels in the one or more adjacent lines; and
   including in the set of adjacent pixels the one or more consecutively adjacent substantially identical pixels.

6. The method of claim 4, wherein expanding the set of adjacent pixels into one or more adjacent lines of pixels comprises:
   expanding the set of adjacent pixels until:
      the expanded set of adjacent pixels' pixel count exceeds the threshold, or the set of adjacent pixels cannot be further expanded.

7. The method of claim 4, wherein expanding the set of adjacent pixels into the one or more adjacent lines of pixels uses a four-neighbor or eight-neighbor iterative search methodology.

8. The method of claim 1, wherein encoding the pixels assigned to the base layer using the first encoding technique comprises:
   identifying a first run of pixels in a line of pixels, the first run having a first starting pixel location; and
   identifying a second run of pixels in the line of pixels, the second run having a second starting pixel location.

9. The method of claim 8, wherein either the first run of pixels, the second run of pixels, or both is in the enhancement layer and the pixels are represented for encoding in the base layer by a special value.

10. The method of claim 8, wherein the first run of pixels and the second run of pixels are each defined using a set of adjacent pixels.

11. The method of claim 8, wherein encoding the pixels in the base layer using the first encoding technique further comprises:
   identifying a previous line of pixels;
   concatenating the first run of pixels and the second run of pixels into a first concatenated run;
   if the first concatenated run has the same color values as a first corresponding run of pixels in the previous line of pixels:
      identifying a last run of pixels as the first concatenated run; and
   if the first concatenated run does not have the same color values as the first corresponding run of pixels in the previous line of pixels:
      encoding the first run of pixels, and
      identifying the last run of pixels as the second run of pixels.

12. The method of claim 11, wherein encoding the pixels in the base layer using the first encoding technique further comprises:
   identifying a third run of pixels in the line of pixels, the third run of pixels having a third starting pixel location;
   concatenating the last run of pixels and the third run of pixels into a second concatenated run;
   if the second concatenated run has the same color values as a second corresponding run of pixels in the previous line of pixels:
      identifying the last run of pixels as the second concatenated run; and
   if the second concatenated run does not have the same color values as the second corresponding run of pixels in the previous line of pixels:
      encoding the last run of pixels, and
      identifying the last run of pixels as the third run of pixels.

13. The method of claim 12, wherein encoding the last run of pixels comprises:
   if the last run of pixels is a concatenated run of pixels, encoding the last run of pixels by referencing the previous line of pixels.

14. The method of claim 8, wherein encoding the first run of pixels comprises:
   determining whether the first run of pixels and a third corresponding run of pixels in a previous line of pixels have the same color values; and if the runs of pixels have the same color values, encoding the first run of pixels by referencing the previous line of pixels.

15. The method of claim 8, wherein encoding the first run of pixels comprises:
determining whether the first run of pixels is substantially identical to at least one run of pixels in a previous line of pixels; and
when there is a substantially identical run of pixels, encoding the first run of pixels by referencing the substantially identical run of pixels.

16. The method of claim 8, wherein encoding the first run of pixels comprises:
determining a color table using previously encoded runs of pixels;
determining whether the first run of pixels has a value substantially identical to a value in the color table; and
if a substantially identical value exists in the color table, encoding the first run of pixels by referencing the substantially identical value in the color table.

17. A method for encoding a video frame having a plurality of pixels, the method comprising:
identifying a plurality of sets of adjacent pixels within the frame, wherein each set includes substantially identical pixels identified by combining color values of adjacent pixels arithmetically and applying a color value threshold to a result of the combining;
determining a number of pixels in each set using a processor;
assigning the pixels in each set to one of an enhancement layer or base layer based at least in part on the number of pixels in that set;
encoding the pixels assigned to the base layer using a first encoding technique; and
encoding the pixels assigned to the enhancement layer using a second encoding technique; wherein
encoding the pixels assigned to the base layer using the first encoding technique comprises:
identifying a first run of pixels in a line of pixels, the first run having a first starting pixel location; and
identifying a second run of pixels in the line of pixels, the second run having a second starting pixel location; and wherein
encoding the first run of pixels comprises:
determining whether a more efficient encoding method is available than directly encoding the first run of pixel's value by determining if any of the pixels in the first run of pixels is marked as being in the base layer; and
if a more efficient method is not available, encoding the first run of pixels by using the first run of pixel's value; wherein
substantially identical pixels have a same color value or a similar color value.

18. An apparatus for encoding a frame of video having a plurality of pixels, the apparatus comprising:
a memory; and
a processor configured to execute instructions stored in the memory to:
identify a plurality of sets of adjacent pixels within the frame, wherein each set includes pixels that are substantially identical and are identified by combining color values of adjacent pixels arithmetically and applying a color value threshold to a result of the combining,
determine a number of pixels in each set,
assign the pixels in each set to one of an enhancement layer or base layer based at least in part on the number of pixels in that set by:
assigning each pixel in a set of adjacent pixels to the base layer if the number of pixels in the set exceeds a pixel count threshold or any pixel in the set of adjacent pixels was previously assigned to the base layer regardless of the pixel count; and
assigning each pixel in the set of adjacent pixels to the enhancement layer if the number of pixels in the set does not exceed the pixel count threshold and no pixel in the set of adjacent pixels was previously assigned to the base layer,
encode the pixels assigned to the base layer using a first encoding technique, and
encode the pixels assigned to the enhancement layer using a second encoding technique; wherein
substantially identical pixels have a same color value or a similar color value.

* * * * *